United States Patent [19]

Egli et al.

[11] Patent Number: 4,695,610

[45] Date of Patent: Sep. 22, 1987

[54] SEMI-2-INTERPENETRATING NETWORKS OF HIGH TEMPERATURE SYSTEMS

[75] Inventors: Annmarie O. Egli, Gloucester; Terry L. St. Clair, Poquoson, both of Va.

[73] Assignee: The United States of America as represented by the Administrator of the National Aeronautics and Space Administration, Washington, D.C.

[21] Appl. No.: 840,816

[22] Filed: Mar. 18, 1986

[51] Int. Cl.$^4$ ............................................. C08F 283/04
[52] U.S. Cl. ..................................... 525/426; 525/432; 525/436; 525/903; 428/290
[58] Field of Search ............... 525/426, 432, 436, 903; 428/290

[56] References Cited

U.S. PATENT DOCUMENTS

| | | | |
|---|---|---|---|
| 3,468,977 | 9/1969 | Bruckman et al. | 525/265 |
| 4,398,021 | 8/1983 | St. Clair et al. | 528/222 |
| 4,650,824 | 3/1987 | Clikeman et al. | 525/426 |

OTHER PUBLICATIONS

Millan, J. R.; J. Appl. Chem.; 1311, 1960.

*Primary Examiner*—John C. Bleutge
*Assistant Examiner*—David W. Woodward
*Attorney, Agent, or Firm*—George F. Helfrich; John R. Manning

[57] ABSTRACT

Semi-2-interpenetrating polymer networks (semi-2-IPNs) of improved qualities are prepared by combining a linear polymer and a cross-linkable oligomer which have identical recurring units. Linear and crosslinking components having identical structures in their backbones are mutually soluble and will thus form one homogenous phase unlike other network system. A novel semi-2-IPN of the present invention is prepared by combining a linear polyimidesulfone with a cross-linking acetylene-terminated polyimidesulfone. This combination results in a semi-2-IPN of improved strength, adhesion, and processability.

12 Claims, 1 Drawing Figure

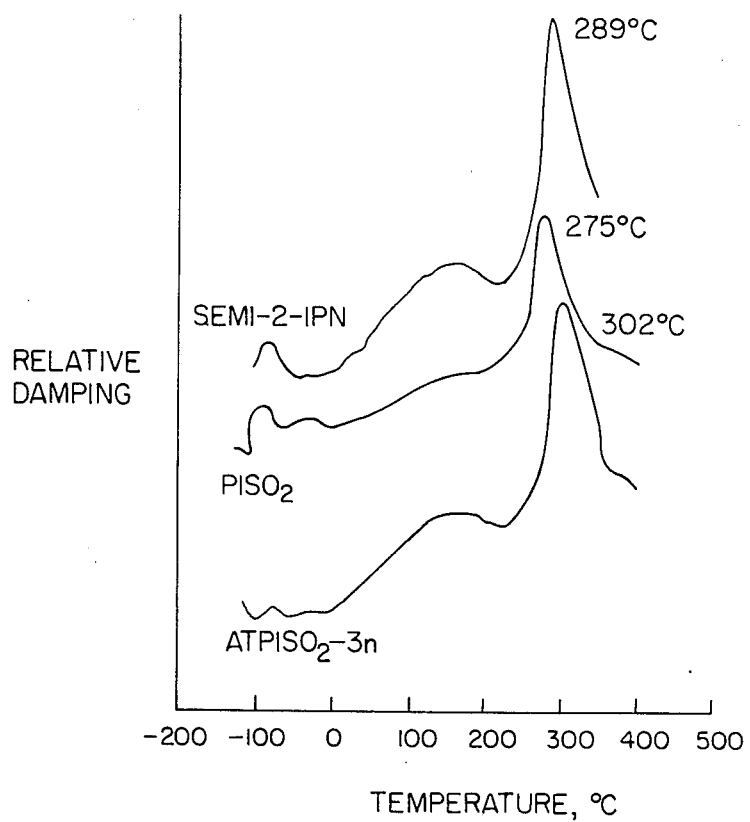

SEMI-2-INTERPENETRATING NETWORKS OF HIGH TEMPERATURE SYSTEMS

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

BACKGROUND OF THE INVENTION

It has been known in the past to combine polymers into interpenetrating networks in order to gain useful properties from the combination of materials. An interpenetrating network is a combination of two polymers in network form, at least one of which is synthesized and/or cross-linked in the immediate presence of the other. In the last several years, much work has been done on interpenetrating network systems (see L.H. Sperling, *Interpenetrating Polymer Networs and Related Materials*, Plenum Press, 1981; D. Klempner and K. C. Frisch, eds., "Polymer Networks", *Polymer Science and Technology*, Vol. 10, 1980; Y. S. Lipatov and L. M. Sergeeva, *Interpenetrating Polymeric Networks*, Naukova Dumka, Kiev, 1979; etc., for reviews). If one of the polymers is linear and one is crosslinked, a semi-interpenetrating polymer network (semi-IPN) results. A semi-IPN can be further categorized. If the first-formed system is crosslinked and the second is linear, it is a semi-1-IPN. The reverse situation yields a semi-2-IPN.

Semi-interpenetrating networks made to date have combined polymers that have different repeating units. An example of such an interpenetrating network is found in U.S. Pat. No. 4,302,553 (Frisch et al.) which discloses macrocylic structures of chemically different cross-linking polymers entangled with each other. Other semi-IPNs made previously have combined a linear and cross-linked polymer with different functional groups, e.g., a polymethylmethacrylate and a polyurethane. No one has yet combined two polymers which have identical recurring units into an interpenetrating network. The combination of a linear polymer and a cross-linkable oligomer with identical repeating units would give a semi-interpenetrating network of improved characteristics.

SUMMARY OF THE INVENTION

It is an object of the present invention to provide a semi-interpenetrating polymer network of improved characteristics by combining a linear polymer and a cross-linkable oligomer with identical recurring units.

Another object of this invention is to provide semi-interpenetrating polymer networks of improved processability and thermooxidative stability.

Still further, it is an object of this invention to provide adhesives, composites or films comprising such semi-interpenetrating polymer networks.

These and other objects are obtained through the combination of a linear polymer with a cross-linkable oligomer wherein the linear polymer and the cross-linkable oligomer have identical recurring polymeric units. In the case where the cross-linking component is formed in the presence of the linear component, the network is be definition a semi-2-interpenetrating network (semi-2-IPN). Thus, an improved semi-2-IPN can be created from any of several different groups of polymers.

One particularly successful semi-2-IPN has been made using polyimidesulfone ($PISO_2$), a linear thermoplastic polymer and acetylene-terminated polyimidesulfone ($ATPISO_2$), an addition polymer in oligomeric form which has repeating units identical to those of $PISO_2$ and latent cross-linking end caps. A semi-2-interpenetrating network of improved characteristics has been made by mixing these polyimides, and allowing the cross-linking $ATPISO_2$ to cure in the presence of the linear $PISO_2$. The resulting semi-2-IPN possesses improved processability, thermooxidative stability, and good adhesive strength.

BRIEF DESCRIPTION OF THE DRAWING

The drawing is a graph of the torsional braid analyses for acetylene-terminated polyimidesulfone, polyimidesulfone, and a semi-2-interpenetrating network formed using the method of the present invention.

DETAILED DESCRIPTION OF THE INVENTION

An improved semi-2-interpenetrating polymer network is provided by combining a linear polymer with a cross-linkable oligomer wherein the linear polymer and the cross-linkable oligomer have identical recurring polymeric units. A cured semi-2-IPN is formed by allowing the cross-linkable oligomer to cure in the presence of the linear polymer. One such semi-2-IPN can be constructed by combining polyimidesulfone, a linear polymer, with acetylene-terminated polyimidesulfone, a cross-linkable oligomer.

Polyimidesulfone ($PISO_2$) is a linear thermoplastic polyimide that has previously been developed by NASA. (U.S. Pat. No. 4,398,021, St. Clair et al.) and has the following chemical structure:

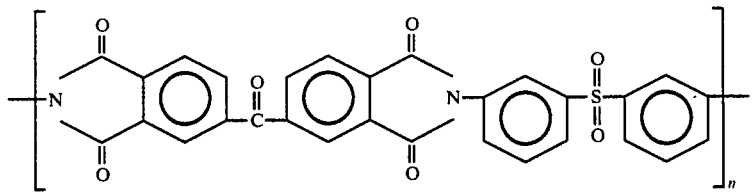

wherein n is an integer from 10 to 200. Polyimidesulfone exhibits good adhesive strength (3000–4000 psi) after extended elevated temperature aging, but like most linear aromatic polyimides, however, is difficult to process. Because it is linear and has a high glass transition temperature (275° C.), it requires high temperature and pressures (300–400 psi) to process.

Acetylene-terminated polyimidesulfone ($ATPISO_2$) has also been previously developed (A. O. Hanky, et al., *Int'l Journal of Adhesion and Adhesives*, Vol. 3, No. 4, Oct. 1983), and is an oligomer with cross-linking acetylene end caps. ATPISO$_2$ has the following chemical formula:

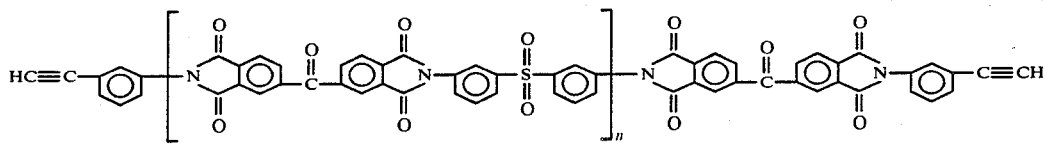

wherein n is an integer from 1 to 10. This oligomer can be made in various chain lengths by varying the ratios of reactants. It has a lower average adhesive strength than PISO$_2$ (2000–3000 psi), but is much more easily processed.

When the acetylene-terminated polyimidesulfone is allowed to cure in the presence of the linear polyimidesulfone, a semi-2-interpenetrating network of improved characteristics is formed. Unlike previous semi-2-interpenetrating networks, this semi-2-IPN combines a polymer and an oligomer with identical functionalities which are thus mutually soluble and form one homogeneous phase. This is observed by the single sharp damping peak seen in the torsional analysis of the semi-2-IPN in the drawing. One advantage of the present invention therefore is to eliminate phase separation problems common to other networks.

Another advantage of the above semi-2-IPN is that the oligomeric ATPISO$_2$ acts as a plasticizer for the linear PISO$_2$ giving it more flow. The linear PISO$_2$ in turn adds toughness to the otherwise brittle ATPISO$_2$ and helps to control its flow. Thus, the resulting semi-2-IPN retains good adhesive strength (2500–3000 psi) while improving the processability over either system alone. Additionally, as a matrix resin, it gives good compaction and fiber wetting at moderate temperatures and pressures. Some semi-2-IPNs according to the present invention also exhibit improved thermooxidative stability.

Thus, there are definite advantages of using this method of combining a linear polymer with a cross-linkable oligomer of identical functional repeating unit into semi-2-interpenetrating networks. The use of polyimidesulfone and its acetylene-terminated oligomer as described above is just one possible embodiment of the present invention. It is also possible to employ polyethers, polyetherketones, polysulfones, polyphenylenes, polyphenylquinoxalines and other polymers in the present method to construct improved semi-2-interpenetrating networks.

The following Examples I–VI are illustrative of the semi-2-IPNs formed by the method of the present invention, and Examples VII–IX evaluate the properties of the semi-2-IPNs thus formed.

EXAMPLE I

A mixture of 65% (by weight) of the linear polyimidesulfone (PISO$_2$) and 35% of the cross-linking 1n acetylene-terminated polyimidesulfone (ATPISO2-1n) was made into a solution. "1n" represents one repeat unit in the chain. The solvents used were diglyme and N-methyl pyrollidinone (NMP) in a 50/50 ratio (by weight). Thus 13.0 g of the linear material was added to 40.0 g of NMP and 40.0 g of diglyme stirring in a nitrogen-flushed, capped jar. Once this solid went into solution, 7.0 gms of the ATPISO$_2$ material was added. This mixture was allowed to stir one hour until all particles were in solution and the solution was clear brown. This resin was physically characterized by various thermal analyses. It was then evaluated as a film, an adhesive and a composite. The test results are reported in Examples VII–IX.

EXAMPLE II

This solution was identical to Example I except acetylene-terminated polyimidesuflone with three repeat units in the chain backbone (ATPISO$_2$-3n) was used. This resin was characterized physically by various thermal analyses. It was then evaluated as described in Example I.

EXAMPLE III

A solution was made identical to that made in Example I except the ratio of the linear to the crosslinked components was changed from 65/35 to 50/50. This 10.0 g of the PISO$_2$ was added to 40 gms each of NMP and diglyme. After this solid was in solution, 10.0 g of the ATPISO$_2$-1n was added and the mixture was allowed to stir for 1 hour as before. This resin was characterized and evaluated as described in Example I.

EXAMPLE IV

This solution was identical to Example III except that ATPISO$_2$-3n was used instead of ATPISO$_2$-1n. The resin was characterized and evaluated as described in Example I.

EXAMPLE V

A solution was made identical to that made in Example IV except this time the ratio of linear to crosslinked component was changed from 50/50 to 35/65. Thus 7.0 gm of PISO$_2$ was added to 40 gms each of NMP and diglyme. After this solid was in solution, 13.0 gms of ATPISO$_2$-1n was added and the mixture allowed to stir for 1 hour. The resin was characterized and evaluated as described in Example I.

EXAMPLE VI

This solution was identical to Example V except that ATPISO$_2$-3n was used. The resin was characterized and evaluated as described in Example I. The test results appear in the following Examples VII–IX.

As mentioned above, the polymer networks according to the invention are useful as adhesives, as matrix resins in composites, and as films. Adhesives are formed by dissolving the uncured polymer network in a suitable solvent or combination of solvents such as the solvent mixture of Example I. The amount of resin solids can vary considerably, depending to a large extent on solubility and viscosity characteristics. In general, an amount of up to 50% resin solids is suitable with 5 to 40% being appropriate in many instances. After application of the adhesive, solvent is removed by drying and the adhesive is then cured. Composites are made by impregnating conventional fabrics, such as woven graphite fiber, with a solvent solution of the curable polymer network followed by removal of solvent and curing, usually under pressure. The solvents may be the same as those suitable for preparing the adhesives. The amount of resin solids in the solution will be generally lower than used as an adhesive becuse it is usually desirable to have a relatively low viscosity in order to achieve penetration into the fabric. A resin solids content of up to about 35% by weight will generally be suitable, and 5 to 25% will be appropriate in may instances. Films can be made from polymer solutions of the polymer network in any convenient manner, such as by solution casting. Solvent is removed from the cast film and the film cured at appropriate curing temperatures of, for example, 225°–325° C.

EXAMPLE VII

To test adhesive bonding, an adhesive scrim cloth was prepared for each resin by stretching 112-E glass cloth over a 15.0×15.0 cm aluminum frame. The cloth was then taken up to 300° C. and held for approximately four hours in order to remove the amino-silane coupling agent that would be a detriment to the long term aging strength of the adhesive. These cloths were brushed coated with each of the resins described in Examples I–VI. The resins consisted of 20% solids in a 50/50 mixture of the solvents diglyme and NMP. Approximately 10 coats were required to build up to the final thickness of approximately 0.03 cm. After each coat, these cloths were air dried and then heated in stages in a forced air oven at a temperature of 140° C. for 0.5 hour to drive off solvent.

Next, two 2.54 cm wide titanium alloy (6Al-4V) fingers were grit blasted, washed and treated with Pasa-Jell 107. The titanium adherends were then primed with resin and heated to 140° C. for 0.5 hour. The scrim cloth was cut and sandwiched in a 1.27 cm overlap bond line between the primed adherends. The adherends were heated under 50 psi pressure to a temperature of 275° C. at a rate of 100°–150° C./min. This temperature was held for 2 minutes then the adherends were cooled under pressure. These bonded samples were postcured 16 hours at 265° C., then isothermally aged at 232° C. for 100 and 1000 hours. The aging temperatures were controlled within ±2% by a Fluke Datalogger Model 2240 C. All lap shear tests were conducted on an Intron Universal Testing Machine according to ASTM D-102. The results of some of these tests appear in Table 1.

The results indicate the network systems lose strength after aging at room temperature but generally show increased strength with aging at elevated temperature. Thus, postcuring sacrifices initial RT strength, but results in much better high temperature properties, especially after long term aging. The overall strengths of the adhesive are very good. All 232° C. test strengths after 1000 hours aging were higher than 2500 psi.

EXAMPLE VIII

The resins made in Example I–VI were evalutated as matrix resins for composites. In order to carry out these tests, a composite prepeg was prepared using a high modulus graphite fiber woven in a 5 harness satin weave. This woven graphite cloth was then stretched across a metal frame and heat cleaned in an air oven at 300° C. for 2 hours.

To facilitate maximum penetration of the resin into the fiber bundles, the percentage of solids was reduced from 20% to 15%. The solutions were then brush coated onto the graphite cloth and staged to 140° C. for 0.5 hour between each coat. Approximately 20 coats were required to build a final thickness of 0.03 cm.

The cloth was then cut into twelve 7.62 cm×7.62 cm squares and stacked in a flat matched metal mold of the same dimensions. The mold was placed in a press preheated to 275° C. and 50 psi pressure was applied from the start. The temperature was then taken up to 300° C. and at that point an additional 50 psi was added. This was held for 0.5 hours and the the mold was allowed to cool under pressure to about 100° C. prior to removal from the press.

The procedure resulted in composites which averaged approximately 45% resin by weight. The semi-2-IPNs exhibited moderate flow, in between that of the low flowing $PISO_2$ and high flowing $ATPISO_2$. The composites were cut into flexural and short beam shear specimens and tested at RT for short beam strength, flexural strength and flexural modulus. The results of some of these tests appear in Table 2.

The advantage of these semi-2-IPNs was observed in the ease of processing of these composites. The $ATPISO_2$ had excess flow. This afforded good fiber wetting and compaction at low pressure, but the flow was difficult to control and resulted in excessive bleedout. The $PISO_2$, on the other hand, was difficult to process because it did not soften and flow readily even above 275° C. The semi-2-IPN had flow that was intermediate between the $PISO_2$ and the $ATPISO_2$. This offers obvious processing advantages. There is enough flow to wet out the fibers and get good consolidation at moderate pressure, but not so much that there is excessive bleedout of the material. Thus, this method may provide a way to access the high thermal capabilities of polyimides in structural composites.

TABLE 1

| Sample | Test Temperature, °C. | Test Temperature, °C. | Aging Time, hrs | Lap Shear Strength, psi |
|---|---|---|---|---|
| 35% $ATPISO_2$-1n/ 65% $PISO_2$ | Ambient | — | — | 3300 |
| | " | 232 | 100 | 3100 |
| | " | 232 | 1000 | 2800 |
| | 232° C. | — | — | 2800 |
| | " | 232 | 100 | 3000 |
| | " | 232 | 1000 | 3000 |
| 35% $ATPISO_2$-3n/ 65% $PISO_2$ | Ambient | — | — | 3900 |
| | " | 232 | 100 | 3500 |
| | " | 232 | 1000 | 3300 |
| | 232° C. | — | — | 1600 |
| | " | 232 | 100 | 1900 |
| | " | 232 | 1000 | 2900 |

TABLE 2

| Sample | Resin % | Flexural Strength[1], ksi | Flexural Modulus, msi | Short Beam Shear Strength, ksi |
|---|---|---|---|---|
| 35% $ATPISO_2$-1n/ 65% $PISO_2$ | 49.1 | 76.2 | 5.2 | 4.2 |
| 50% $ATPISO_2$-1n/ 50% $PISO_2$ | 46.2 | 85.2 | 5.4 | 4.4 |
| 65% $ATPISO_2$-1n/ 35% $PISO_2$ | 44.0 | 84.3 | 7.8 | 4.8 |

[1]Dimensions of flex specimens: 7.62 cm × 1.27 cm
[2]Dimensions of SBS specimens: 1.59 cm × 0.635 cm

EXAMPLE IX

Films were prepared using the resins made in Examples I–VI, using a composition of 20% solids in a 50/50 mixture of diglyme and NMP. The resins were spread onto 0.6 cm thick plate glass using a doctor blade with an 0.0075 cm blade gap. The films were then air-dried until tack free and staged to 300° C. in an air oven according to the following cycle:

| Temperature | Hold at Temperature |
|---|---|
| Ambient to 100° C. | 1 hour at 100° C. |
| 100° C. to 200° C. | 1 hour at 200° C. |
| 200° C. to 300° C. | 1 hour at 300° C. |
| 300° C. to ambient | |

This yielded films approximately 0.0025 cm thick. These films were then tested to determine glass transition temperature, Tg. The results indicated that the semi-2-IPNs have Tg's intermediate between the Tg of the linear $PISO_2$ (275° C.) and the thermoset $ATPISO_2$-1n (330° C. or $ATPISO_2$-3n (302° C.).

The semi-2-IPNs and the linear and cross-linked polyimides were also evaluated by torsional braid analysis. This led to another significant result, as indicated in the comparision of the linear and cross-linked components alone and the $ATPISO_2$-3n semi-2-IPN, as observed in the drawing. The semi-2-IPN has a much narrower damping peak than either of the polyimides alone. This may indicate that the components have been combined and only one phase exists. The results would seem to indicated that the cross-linked $ATPISO_2$ and the linear $PISO_2$ are mutually soluble.

Another advantage of combining a tough linear system like $PISO_2$ and a brittle, cross-linked system like $ATPISO_2$ is that the resulting network can have improved processability over either system alone. These qualities are achieved because the linear system adds toughness and controls the flow of the cross-linkable material, while the cross-linkable material acts as a plasticizer for the linear material and improves its flow properties. As the semi-2-IPNs go to greater amounts of cross-linking material, they elongate to a lesser degree.

The isothermal testing of these films showed that the above improvement in flow is achieved with little loss in thermooxidative stability. It was observed that the semi-2-IPNs lost only about 2% of their initial weight, and then maintained this weight beyond 300 hours at the isothermal temperature. This was an improvement over both the linear $PISO_2$, which dropped off in weight nearly linearly with temperature, and the cross-linking ATPISO2, which lost approximately 4% of its initial weight before stabilizing. Thus, the semi-2-IPNs of the present invention show improved thermooxidative stability over either of its individual components alone.

We claim:

1. In the method of making a semi-2-interpenetrating polymer network wherein a linear polymer is combined with a cross-linkable oligomer, the improvement wherein the linear polymer comprises polyimidesulfone and the cross-linkable oligomer comprises acetylene-terminated polyimidesulfone.

2. A method as claimed in claim 1 wherein the polyimidesulfone has the following structural formula:

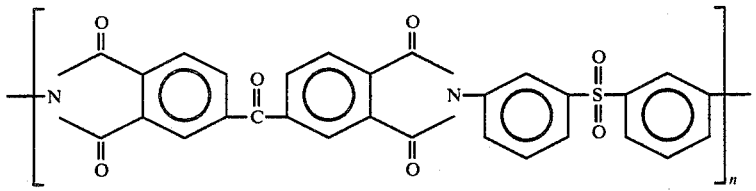

wherein
n is an integer from 10 to 200
and wherein the acetylene-terminated polyimidesulfone has the followig structural formula:

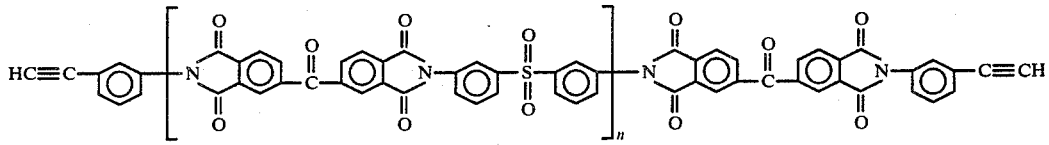

wherein n is an integer from 1 to 10.

3. A method as claimed in claim 1 wherein the amount of polyimidesulfone used ranges from about 65% to about 35% and the amount of acetylene-terminated polyimidesulfone used ranges from about 35% to about 65%.

4. A method as claimed in claim 1 further comprising curing the cross-linkable oligomer.

5. In a semi-2-interpenetrating polymer network comprising a linear polymer combined with a cross-linkable oligomer curable in the presence of the linear polymer, the improvement wherein the linear polymer comprises polyimidesulfone and the cross-linkable oligomer comprises acetylene-terminated polyimidesulfone.

6. A semi-2-interpenetrating polymer network as claimed in claim 5 wherein the polyimidesulfone has the following structural formula:

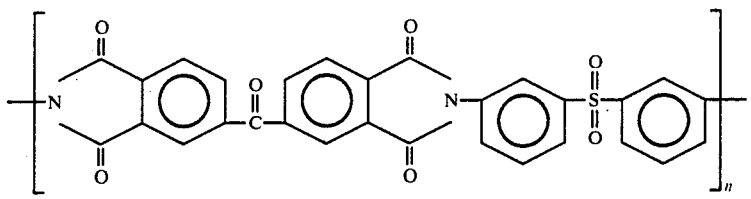

wherein
  n is an integer from 10 to 200
  and wherein the acetylene-terminated polyimidesulfone has the following structural formula:

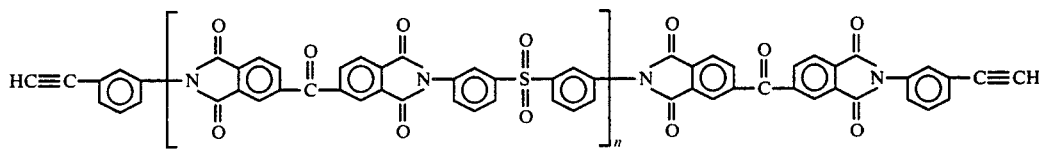

wherein n is an integer from 1 to 10.

7. A semi-2-interpenetrating polymer network as claimed in claim 5 wherein the amount of polyimidesulfone ranges from about 65% to about 35% and the amount of actylene-terminated polyimidesulfone ranges from about 35% to about 65%.

8. An adhesive comprising a solution of a semi-2-interpenetrating polymer network and a solvent, said semi-2-interpenetrating polymer network comprising a linear polymer combined with a cross-linkable oligomer, wherein said linear polymer comprises polyimidesulfone and said cross-linkable oligomer comprises acetylene-terminated polyimidesulfone.

9. An adhesive as claimed in claim 8 wherein said semi-2-interpenetrating polymer network is present in said adhesive in an amount of up to 50% by weight.

10. An adhesive as claimed in claim 8 wherein the solvent comprises N-methyl pyrollidinone and diglyme.

11. In a composite comprsing resin-impregnated fabric, the improvement wherein said resin comprises a semi-2-interpenetrating polymer network, said semi-2-interpenetrating polymer network comprising a linear polymer combined with a cross-linkable oligomer, wherein said linear polymer comprises polyimidesulfone and said cross-linkable oligomer comprises acetylene-terminated polyimidesulfone.

12. A self-supporting polymer film comprising a semi-2-interpenetrating polymer network, said semi-2-interpenetrating polymer network comprising a linear polymer combined with a cross-linked oligomer cured in the presence of the linear polymer, wherein said linear polymer comprises polyimidesulfone and said cross-linked oligomer comprises acetylene-terminated polyimidesulfone.

* * * * *